United States Patent
Agrawal et al.

(10) Patent No.: US 12,003,135 B2
(45) Date of Patent: *Jun. 4, 2024

(54) INTEGRATED PFC AND DC DC CONVERTER FOR DUAL DC BUS FOR ONLINE UPS APPLICATION

(71) Applicant: SCHNEIDER ELECTRIC IT CORPORATION, Foxboro, MA (US)

(72) Inventors: Hariom Agrawal, Bengaluru (IN); Mihir Sunil Thatte, Thane (IN); Pradeep Tolakanahalli Nagabhushanrao, Bangalore (IN)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/201,801

(22) Filed: May 25, 2023

(65) Prior Publication Data
US 2024/0106263 A1  Mar. 28, 2024

Related U.S. Application Data

(63) Continuation of application No. 17/523,962, filed on Nov. 11, 2021, now Pat. No. 11,705,753.

(30) Foreign Application Priority Data

Dec. 9, 2020 (IN) .............. 202011053522

(51) Int. Cl.
*H02J 9/06* (2006.01)
*H02M 1/42* (2007.01)
*H02M 3/158* (2006.01)

(52) U.S. Cl.
CPC .......... *H02J 9/061* (2013.01); *H02M 1/4225* (2013.01); *H02M 3/1582* (2013.01)

(58) Field of Classification Search
CPC .. H02M 1/4225; H02M 1/0083; H02M 5/458; H02M 1/10; H02M 3/1582;
(Continued)

(56) References Cited

U.S. PATENT DOCUMENTS 6,198,176 B1 * 3/2001 Gillette ............... H02J 9/08
307/64
9,024,476 B2 5/2015 Ghosh et al.
(Continued)

FOREIGN PATENT DOCUMENTS

EP    3661008 A1    6/2020

OTHER PUBLICATIONS

Extended European Search Report from corresponding European Application No. 21208610.2 dated Apr. 12, 2022.

*Primary Examiner* — Jared Fureman
*Assistant Examiner* — Esayas G Yeshaw
(74) *Attorney, Agent, or Firm* — Lando & Anastasi, LLP

(57) ABSTRACT

An Uninterruptible Power Supply (UPS) including an input configured to receive input AC power, a backup power input configured to receive backup DC power having a first voltage level from a backup power source, a converter configured to convert the input AC power from the input and the backup DC power from the backup power input into DC power having a second voltage level, the converter including an input selection circuit configured to selectively couple the converter to the input and the backup power input, an inductor, a first converter switch configured to couple a first end of the inductor to a neutral connection, and a second converter switch configured to couple a second end of the inductor to the backup power input via the input selection circuit.

20 Claims, 7 Drawing Sheets

(58) Field of Classification Search
CPC ........ H02M 3/1557; H02J 9/068; H02J 9/061; Y02B 70/10
See application file for complete search history.

(56) References Cited

U.S. PATENT DOCUMENTS

| | | | |
|---|---|---|---|
| 10,819,140 B1* | 10/2020 | Maalouf | H02J 13/00 |
| 2018/0037121 A1* | 2/2018 | Narla | B60L 55/00 |
| 2019/0334376 A1* | 10/2019 | Toyoda | H02P 27/06 |

* cited by examiner

INTEGRATED PFC AND DC DC CONVERTER FOR DUAL DC BUS FOR ONLINE UPS APPLICATION

CROSS-REFERENCE TO RELATED APPLICATION

This application is a continuation of U.S. patent application Ser. No. 17/523,962, filed on Nov. 11, 2021, which claims the benefit under 35 U.S.C. § 119 of Indian Patent Application No. 202011053522, filed on Dec. 9, 2020. Each application referenced above is hereby incorporated herein by reference in its entirety for all purposes.

BACKGROUND

1. Field of Invention

Embodiments of this disclosure relate generally to power conversion, and more particularly, to AC-DC power conversion in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security data center management systems may also receive backup power between 1 and 20 kVA for several hours.

SUMMARY

At least one aspect of the present disclosure is directed to an Uninterruptible Power Supply (UPS). The UPS includes an input configured to receive input AC power, a backup power input configured to receive backup DC power having a first voltage level from a backup power source, a converter configured to convert the input AC power from the input and the backup DC power from the backup power input into DC power having a second voltage level, the converter including an input selection circuit configured to selectively couple the converter to the input and the backup power input, an inductor, a first converter switch configured to couple a first end of the inductor to a neutral connection, and a second converter switch configured to couple a second end of the inductor to the backup power input via the input selection circuit.

In one embodiment, the UPS includes an output configured to provide output AC power to a load, and an inverter coupled to the output and configured to convert the DC power having the second voltage level into the output AC power and provide the output AC power to the output. In some embodiments, the UPS includes a DC bus coupled to the converter and configured to receive the DC power having the second voltage level, and a controller coupled to at least the converter and configured to operate the first converter switch in a first mode of operation to provide DC power having the second voltage level to the DC bus derived from the input AC power and the first and second converter switches in a second mode of operation to provide DC power having the second voltage level to the DC bus derived from the backup DC power. In various embodiments, the controller is configured to monitor the input AC power, operate, in response to a determination that the input AC power is acceptable, the UPS in the first mode of operation, and operate, in response to a determination that the input AC power is unacceptable, the UPS in the second mode of operation. In certain embodiments, the controller is configured to control the input selection circuit to couple the input to the converter during the first mode of operation.

In some embodiments, the controller is configured to control the input selection circuit to couple the backup power input to the converter during the second mode of operation. In one embodiment, the first converter switch is a bidirectional switch circuit including a first switch and a second switch coupled in series. In certain embodiments, the first and second switches of the first converter switch each have a drain, a gate, and a source, the drain of the first switch being coupled to the first end of the inductor, the gate of the first switch being coupled to the gate of the second switch, the source of the first switch being coupled to the source of the second switch, and the drain of the second switch being coupled to the neutral connection. In various embodiments, the converter includes a first output coupled to a first rail of the DC bus, a second output coupled to a second rail of the DC bus, and a first diode having an anode coupled to the second output and a cathode coupled to the second converter switch and the input selection circuit.

In certain embodiments, the converter includes a first capacitor coupled between the first output and the neutral connection, a second capacitor coupled between the second output and the neutral connection, a second diode having a cathode coupled to the first capacitor and the first output, and a third diode having an anode coupled to the second capacitor and the second output. In various embodiments, the first end of the inductor is coupled to an anode of the second diode and a cathode of the third diode. In one embodiment, the inductor, the second diode, the first capacitor, and the first converter switch are configured to operate as a Power Factor Correction (PFC) boost converter during a positive half cycle of the input AC power in the first mode of operation. In some embodiments, the inductor, the third diode, the second capacitor, and the first converter switch are configured to operate as a Power Factor Correction (PFC) boost converter during a negative half cycle of the input AC power in the first mode of operation.

In one embodiment, the inductor, the second diode, the first capacitor, the first converter switch, and the second converter switch are configured to operate as a boost converter during a positive half cycle of the output AC power in the second mode of operation. In some embodiments, the inductor, the first diode, the second capacitor, the first converter switch, and the second converter switch are configured to operate as a buck-boost converter during a negative half cycle of the output AC power in the second mode of operation. In various embodiments, a negative terminal of the backup power source is configured to be connected to the neutral connection.

Another aspect of the present invention is directed to a non-transitory computer-readable medium storing thereon sequences of computer-executable instructions for controlling an Uninterruptible Power Supply (UPS) including an input configured to receive input AC power, a backup power input configured to receive backup DC power having a first voltage level from a backup power source, and a converter including an inductor coupled to the input and the backup power input via an input selection circuit, the converter being configured to convert the input AC power from the input and the backup DC power from the backup power input into DC power having a second voltage level. The sequences of computer-executable instructions include instructions that instruct at least one processor to monitor the input AC power received at the input, operate, in response to a determination that the input AC power is acceptable, the UPS in a first mode of operation to provide DC power having the second voltage level derived from the input AC power by operating a first converter switch configured to couple a first end of the inductor to a neutral connection, and operate, in response to a determination that the input AC power is unacceptable, the UPS in a second mode of operation to provide DC power having the second voltage level derived from the backup DC power by operating the first converter switch and a second converter switch configured to couple a second end of the inductor to the backup power input via the input selection circuit.

In one embodiment, the sequences of instructions include instructions that cause the at least one processor to control the input selection circuit to couple the input to the inductor during the first mode of operation, and control the input selection circuit to couple the backup power input to the inductor during the second mode of operation. In some embodiments, the sequences of instructions include instructions that cause the at least one processor to operate the converter as a Power Factor Correction (PFC) boost converter in the first mode of operation. In certain embodiments, the sequences of instructions include instructions that cause the at least one processor to operate, during a positive half cycle of the output AC power, the converter as a boost converter in the second mode of operation. In various embodiments, the sequences of instructions include instructions that cause the at least one processor to operate, during a negative half cycle of the output AC power, the converter as a buck-boost converter in the second mode of operation.

BRIEF DESCRIPTION OF THE DRAWINGS

Various aspects of at least one embodiment are discussed below with reference to the accompanying FIGURES, which are not intended to be drawn to scale. The FIGURES are included to provide illustration and a further understanding of the various aspects and embodiments, and are incorporated in and constitute a part of this specification, but are not intended as a definition of the limits of the invention. In the FIGURES, each identical or nearly identical component that is illustrated in various FIGURES is represented by a like numeral. For purposes of clarity, not every component may be labeled in every figure. In the FIGURES.

DETAILED DESCRIPTION

Figure 1:
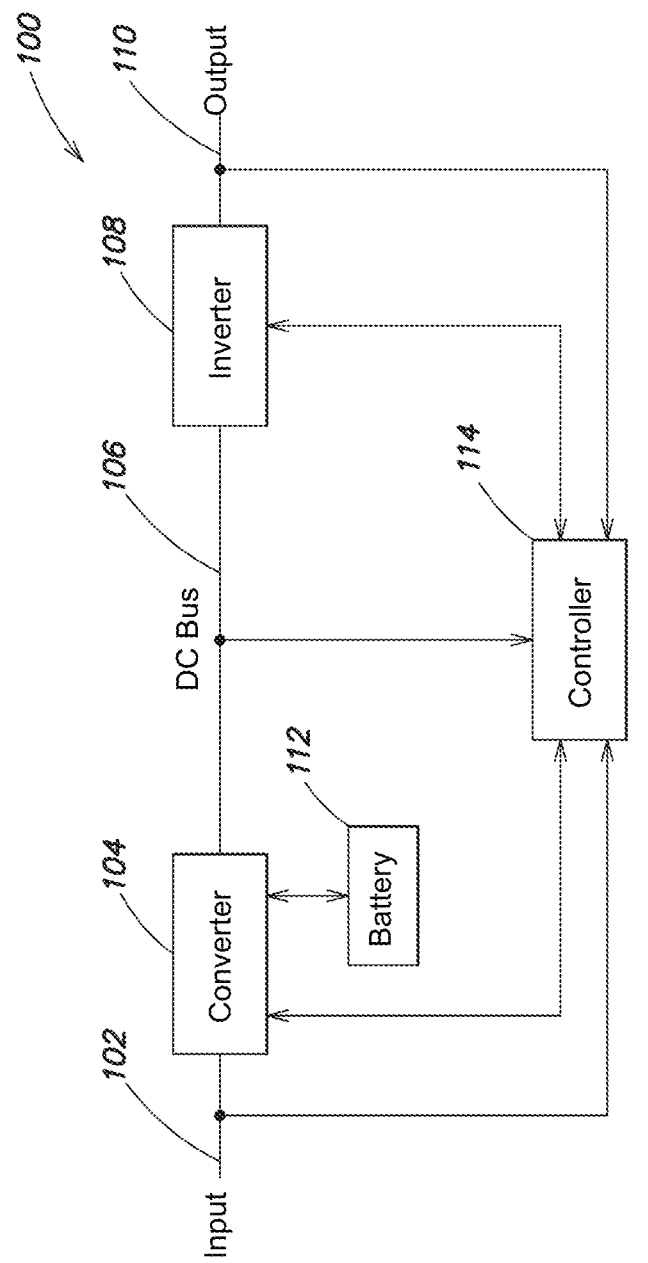
FIG. 1 is a functional block diagram of a UPS in accordance with aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter circuit (PFC) to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

In many cases, such online UPS topologies include a PFC converter to provide DC power to the DC bus when AC mains is available and a separate DC/DC converter to provide DC power to the DC bus from the battery when AC mains is unavailable. As such, these online UPS topologies often have a high component count which can result in increased cost, increased system complexity, and reduced power density. In addition, such UPS topologies often include components which are unused or idle during at least one mode of operation of the online UPS.

A more cost effective and compact online UPS topology is provided herein. In at least one embodiment, the topology includes a converter selectively coupled to an input configured to receive input AC power and a backup power input configured to receive backup DC power. In one example, the converter is configured to provide DC power to a DC bus of the UPS derived from either the input AC power or the backup DC power. In some examples, the improved online UPS topology may have a reduced component count, increasing the power density of the UPS and reducing cost.

FIG. 1 is a block diagram of one embodiment of an online UPS 100 that can provide regulated power from input AC power received at an input 102, as well as back-up DC power from a backup power source 112 (e.g., a battery), to an output 110. In some examples, the backup power source 112 may be included in the UPS 100; however, in other examples, the backup power source 112 may be external to the UPS 100. The UPS 100 includes a converter 104, a DC bus 106, an inverter 108, and a controller 114 for controlling the converter 104 and the inverter 108. The DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power quality threshold), the controller 114 operates the UPS 100 in an online mode of operation.

In the online mode of operation, AC power from the input 102 is provided to the converter 104. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a separate DC/DC converter (e.g., a charger). The controller 114 operates the inverter 108 to convert the DC power into regulated AC power and provide the regulated AC power to a load coupled to the output 110.

When AC power provided to the input 102 is not acceptable (i.e., below an input power quality threshold), the controller 114 operates the UPS 100 in a backup mode of operation. In the backup mode of operation, DC power from the backup power source 112 is provided to the DC bus 106. The inverter 108 receives the DC power from the DC bus 106, and the controller 114 operates the inverter 108 to convert the DC power from the DC bus 106 into regulated AC power and provide the regulated AC power to the output 110.

As discussed above, many online UPS topologies employ separate DC/DC converters for converting the input AC power and the backup DC power. For example, in such topologies, the converter 104 may include a PFC converter configured to provide DC power to the DC bus 106 derived from the input AC power during the online mode of operation and a separate DC/DC converter configured to provide DC power to the DC bus 106 derived from the backup DC power during the backup mode of operation. While such topologies can be utilized to provide uninterrupted power, the use of multiple converters requires the use of additional components, increasing cost and complexity while the reducing power density. As such, it may be advantageous to configure the converter 104 as a single multi-function converter capable of providing DC power to the DC bus 106 derived from either the input AC power or the backup DC power.

Figure 2:
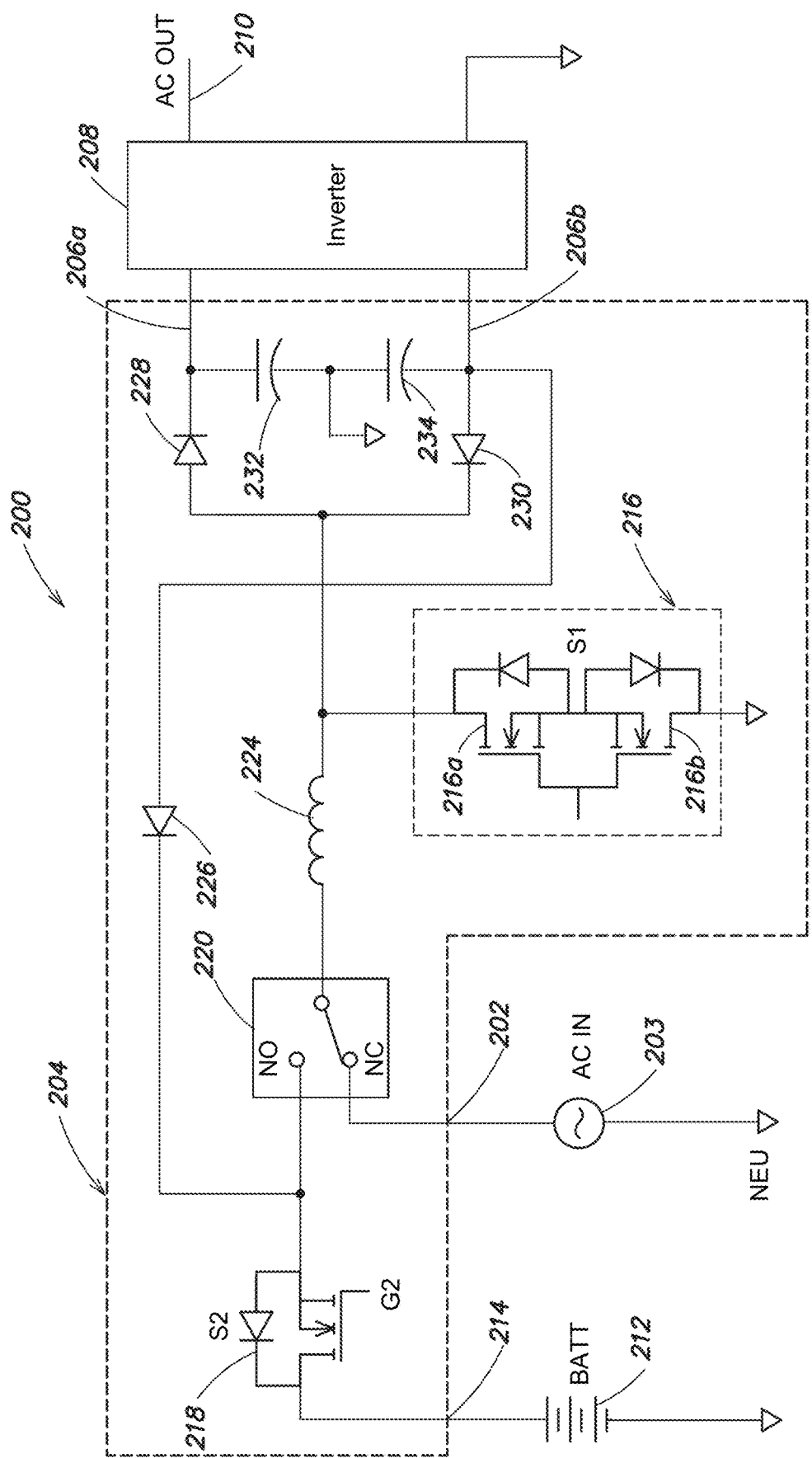
FIG. 2 is a schematic diagram of a UPS topology in accordance with aspects described herein.

FIG. 2 is a schematic diagram of a UPS topology 200 according to aspects described herein. In one example, the UPS topology 200 corresponds to the UPS 100 of FIG. 1. The UPS topology 200 includes an input 202 coupled to an input AC source 203, a converter 204, a DC bus 206a, 206b (referred to collectively herein as DC bus 206), an inverter 208, and an output 210. In one example, the UPS topology 200 includes a backup power source 212 (e.g., a battery) coupled to a backup power input 214. In some examples, the backup power source 212 may be included in the UPS topology 200; however, in other examples, the backup power source 212 may be separate from the UPS topology 200.

In one example, the converter 204 includes a first converter switch 216, a second converter switch 218, an input selection circuit 220, an inductor 224, a first diode 226, a second diode 228, a third diode 230, a first capacitor 232, and a second capacitor 234. In one embodiment, the first and second converter switches 216, 218 are Metal-Oxide-Semiconductor Field-Effect Transistors (MOSFETs); however, in other embodiments, different types of switches or transistors can be utilized (e.g., Insulated-Gate Bipolar Transistors (IGBTs)). In some examples, each switch has a gate, a drain, and a source. In this context, "drain" may refer to any device terminal at which current enters the switch. Likewise, "source" may refer to any device terminal at which current exits the switch.

In some examples, the first converter switch 216 is a bidirectional switch circuit including a first switch 216a coupled in series with a second switch 216b. In one example, the source of the first switch 216a is coupled to the drain of the second switch 216b and the drain of the second switch 216b is coupled to neutral. As such, the first converter switch 216 can be turned on (i.e., closed) by turning on both the first switch 216a and the second switch 216b to provide a bi-directional conduction path. Likewise, the first converter switch 216 can be turned off (i.e., opened) by turning off both the first switch 216a and the second switch 216b.

As shown, the input selection circuit 220 is configured to couple the inductor 224 to one of the input 202 or the backup power input 214 (via the second converter switch 218). In one example, a first end of the inductor 224 is coupled to the drain of the first switch 216a, an anode of the second diode 228 and a cathode of the third diode 230 and a second end of the inductor 224 is coupled to the input selection circuit 220. A first end of the first capacitor 232 is coupled to a cathode of the second diode 228 and the first rail 206a of the DC bus 206 and at a second end to neutral. Likewise, the second capacitor 234 is coupled at a first end to an anode of the first diode 226, an anode of the third diode 230, and the second rail of the DC bus 206b and at a second end to neutral. A cathode of the first diode 226 is coupled to the input selection circuit 220 and the source of the second converter switch 218. The drain of the second converter switch 218 is coupled to the backup power source 212.

In at least one example, the UPS topology 200 can be operated in various modes of operation. For example, in the online mode of operation, the input selection circuit 220 is controlled to couple the second end of the inductor 224 to the input 202 such that AC power from the input 202 is provided to the converter 204. The converter 204 converts the AC power into DC power having the DC bus voltage level and provides the DC power having the DC bus voltage level to the DC bus 206.

Figure 3A:
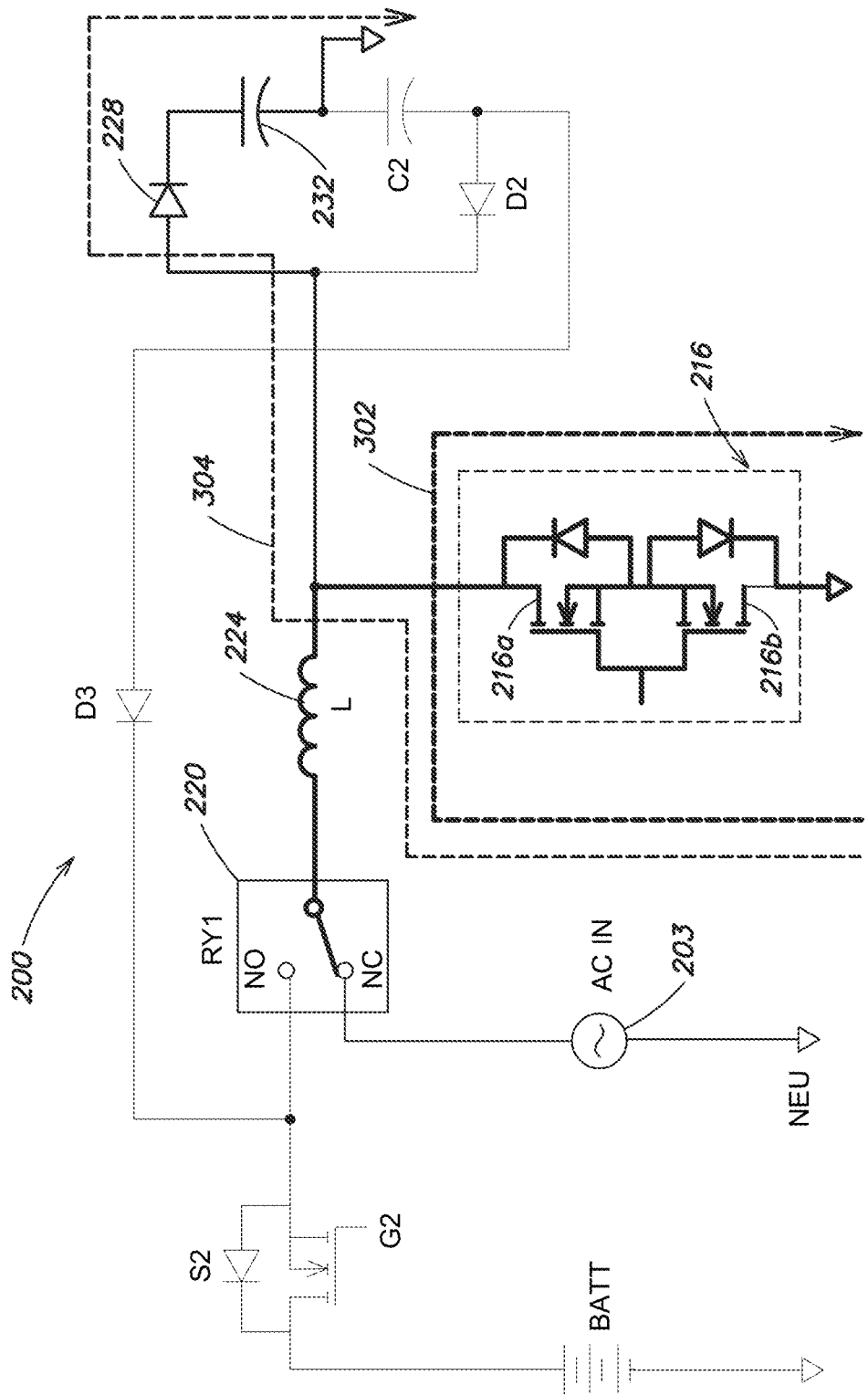
FIGS. 3A and 3B are schematic diagrams of the UPS topology of FIG. 2, illustrating an online mode of operation in accordance with aspects described herein.
Figure 3B:
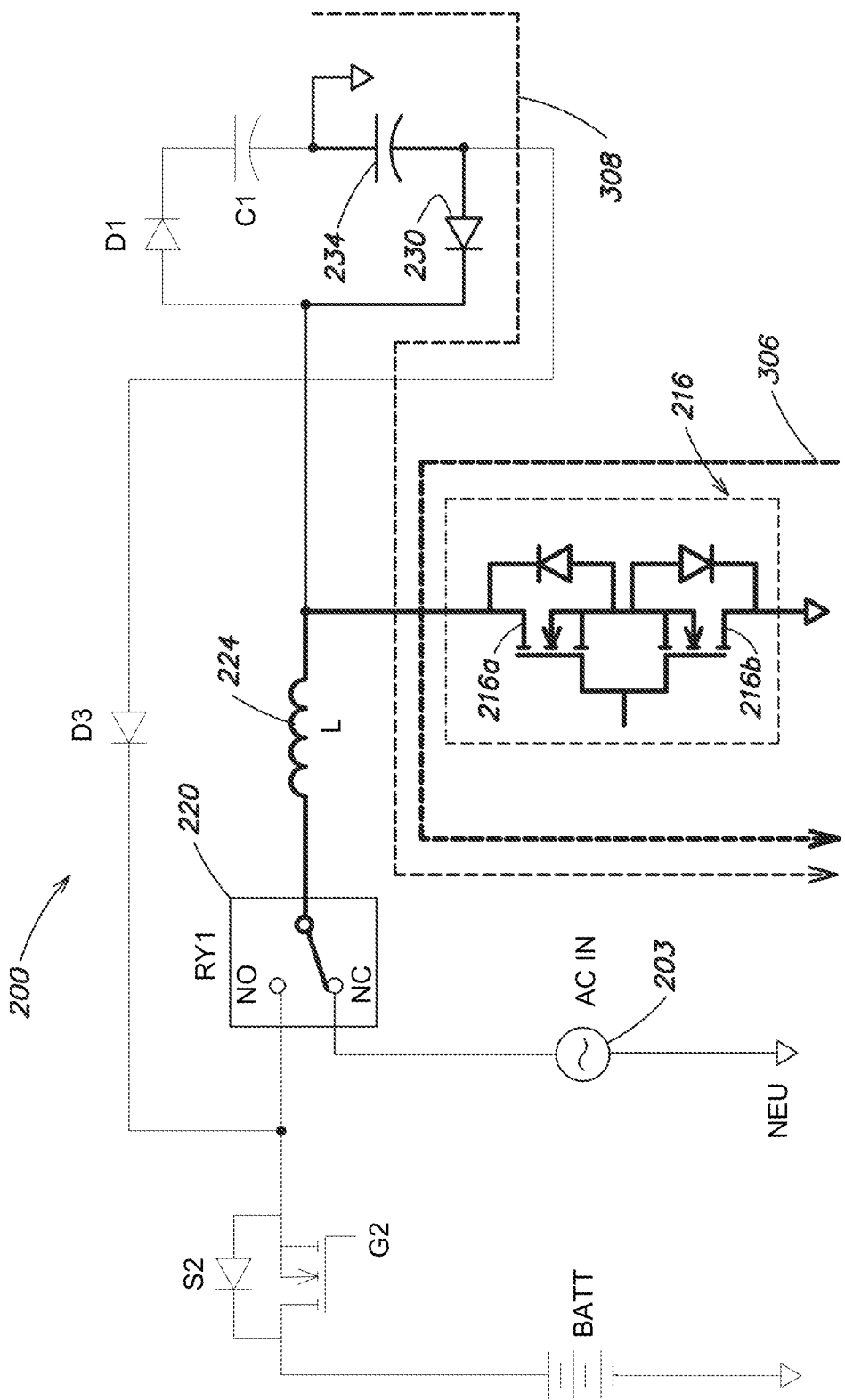

FIGS. 3A and 3B are schematic diagrams illustrating the online mode of operation during positive and negative half cycles of the input AC voltage corresponding to the input AC power.

As shown in FIG. 3A, during the online mode of operation and a positive half cycle of the input AC voltage, the first converter switch 216 is operated to provide DC power to the DC bus 206 derived from the input AC power (provided by the input AC source 203). In some examples, the first converter switch 216, the inductor 224, the second diode 228, and the first capacitor 232 are operated as a PFC boost converter to provide DC power to the first rail 206a of the DC bus 206.

In one example of the online mode of operation during a positive half cycle of the input AC voltage, the first converter switch 216 is turned on and off to provide the PFC boost converter operation. For example, when the first converter switch 216 is turned on (i.e., closed), the first end of the inductor 224 is coupled to neutral. As such, a conduction path 302 for the input AC power is provided through the first converter switch 216, energizing the inductor 224. In one example, the conduction path 302 may include at least one body diode of the switches 216a, 216b of the first converter switch 216. Likewise, when the first converter switch 216 is turned off (i.e., opened), the inductor 224 is decoupled from neutral. As such, a conduction path 304 for the input AC power is provided through the inductor 224 and the second diode 228 to charge the first capacitor 232 and provide DC power to the first rail 206a of the DC bus 206.

As shown in FIG. 3B, during the online mode of operation and a negative half cycle of the input AC voltage, the first converter switch 216 is operated in a similar manner to provide DC power to the DC bus 206 derived from the input AC power. In some examples, the first converter switch 216, the inductor 224, the third diode 230, and the second capacitor 234 are operated as a PFC boost converter to provide DC power to the second rail 206b of the DC bus 206.

In one example of the online mode of operation during a negative half cycle of the input AC voltage, the first converter switch 216 is turned on and off to provide the PFC boost converter operation. For example, when the first converter switch 216 is turned on (i.e., closed), the first end of the inductor 224 is coupled to neutral and a conduction path 306 for the input AC power is provided through the first converter switch 216, energizing the inductor 224. In one example, the conduction path 306 may include at least one body diode of the switches 216a, 216b of the first converter switch 216. Likewise, when the first converter switch 216 is turned off (i.e., opened), the inductor 224 is decoupled from neutral. As such, a conduction path 308 for the input AC power is provided through the inductor 224 and the third diode 230 to charge the second capacitor 234 and provide DC power to the second rail 206b of the DC bus 206. In some examples, the second converter switch 218 remains turned off (i.e., opened) during the online mode of operation.

In the backup mode of operation, the input selection circuit 220 is controlled to couple the second end of the inductor 224 to the backup power input 214 such that backup DC power from the backup power source 212 is provided to the converter 204. The converter 204 converts the backup DC power into DC power having the DC bus voltage level and provides the DC power having the DC bus voltage level to the DC bus 206.

Figure 4A:
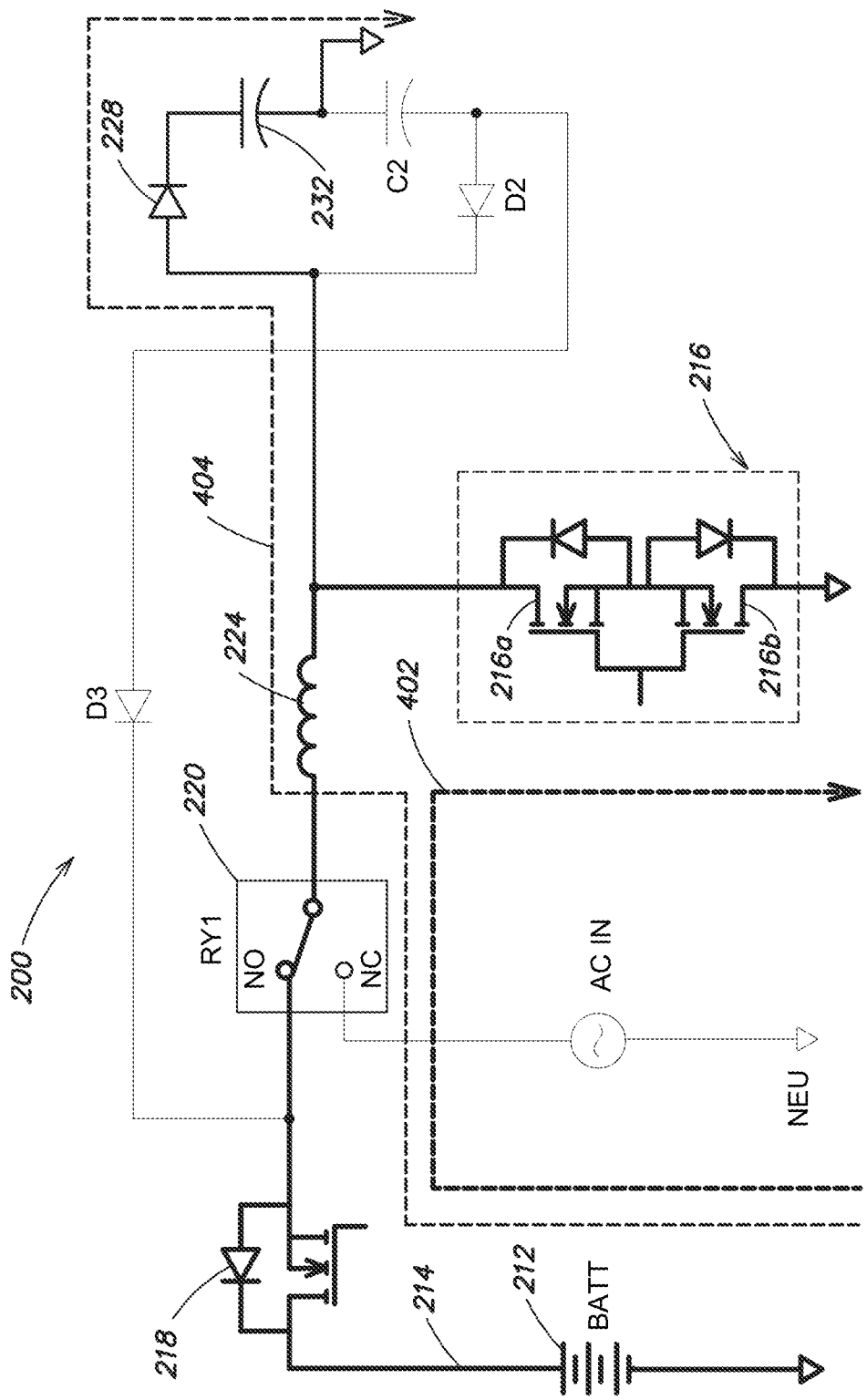
FIGS. 4A and 4B are schematic diagrams of the UPS topology of FIG. 2, illustrating a backup mode of operation in accordance with aspects described herein.
Figure 4B:
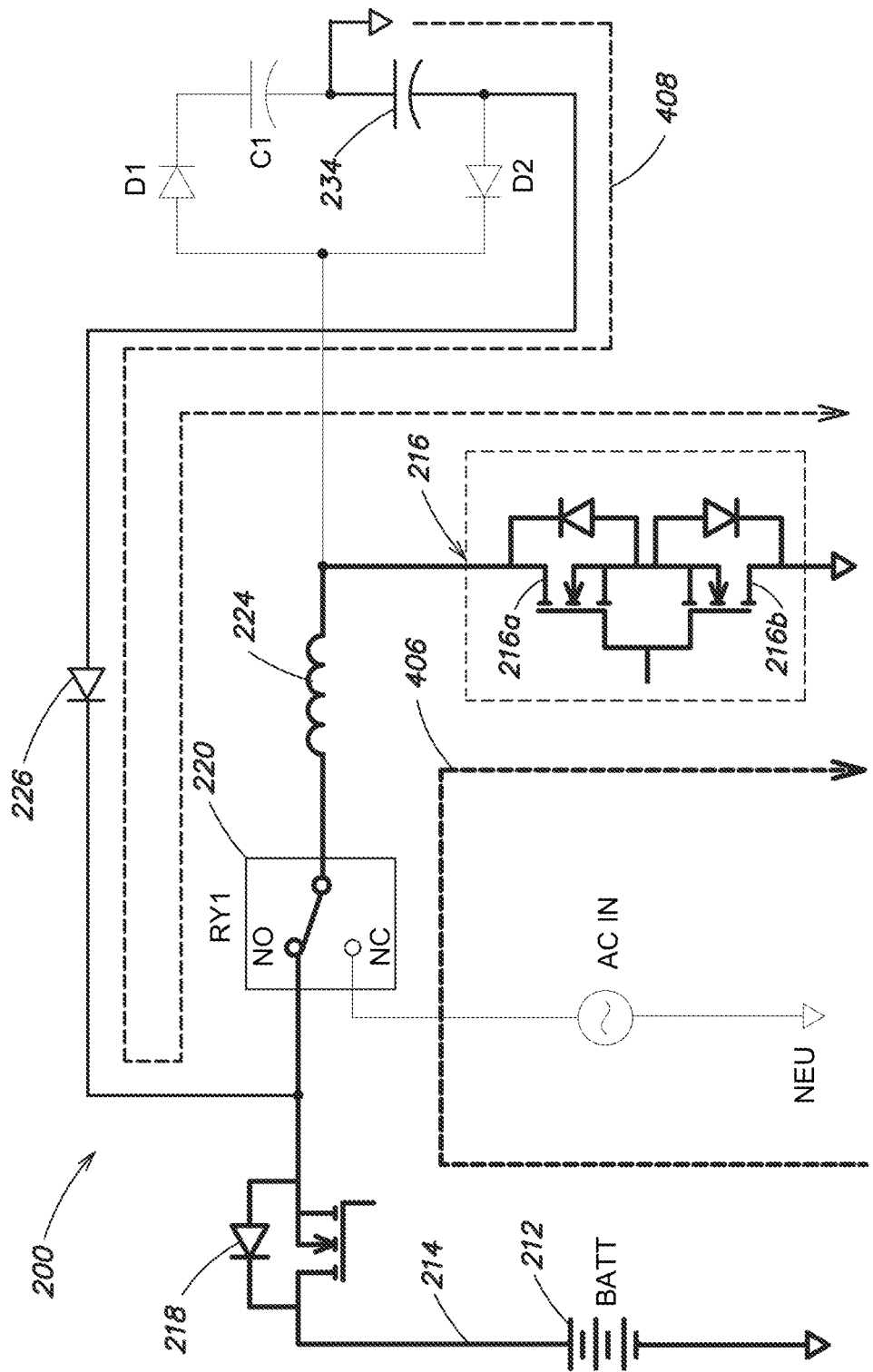

FIGS. 4A and 4B are schematic diagrams illustrating the backup mode of operation during positive and negative half cycles of the output AC voltage corresponding to the output AC power provided by the inverter 208.

As shown in FIG. 4A, during the backup mode of operation and a positive half cycle of the output AC voltage, the first converter switch 216 and the second converter switch 218 are operated to provide DC power to the DC bus 206 derived from the backup DC power (provided by the backup power source 212). In some examples, the converter switches 216 and 218, the inductor 224, the second diode 228, and the first capacitor 232 are operated as a boost converter to provide DC power to the first rail 206a of the DC bus 206.

In one example of the backup mode of operation, during a positive half cycle of the output AC voltage, the converter switches 216, 218 are transitioned between a first and a second switch state to provide the boost converter operation. For example, in the first switch state, the first converter switch 216 is turned on (i.e., closed) to couple the first end of the inductor 224 to neutral. Simultaneously, the second converter switch 218 is turned on (i.e., closed) to couple the backup power input 214 to the input selection circuit 220. As such, a conduction path 402 for the backup DC power is provided through the first and second converter switches 216, 218, energizing the inductor 224. In one example, the conduction path 402 may include at least one body diode of the switches 216a, 216b of the first converter switch 216. Likewise, in the second switch state, the first converter switch 216 is turned off (i.e., opened) to decouple the inductor 224 from neutral and the second converter switch 218 remains turned on (i.e., closed). As such, a conduction path 404 for the backup DC power is provided through the second converter switch 218, the inductor 224, and the second diode 228 to charge the first capacitor 232 and provide DC power to the first rail 206a of the DC bus 206.

As shown in FIG. 4B, during the backup mode of operation and a negative half cycle of the output AC voltage, the first and second converter switches 216, 218 are operated to provide DC power to the DC bus 206 derived from the backup DC power. In some examples, the converter switches 216 and 218, the inductor 224, the first diode 226, and the second capacitor 234 are operated as a buck-boost converter to provide DC power to the second rail 206b of the DC bus 206.

In another example of the backup mode of operation, during a negative half cycle of the output AC voltage, the converter switches 216, 218 are transitioned between a third and a fourth switch state to provide the buck-boost converter operation. For example, in the third switch state, the first converter switch 216 is turned on (i.e., closed) to couple the first end of the inductor 224 to neutral. Simultaneously, the second converter switch 218 is turned on (i.e., closed) to couple the backup power input 214 to the input selection circuit 220. As such, a conduction path 406 for the backup DC power is provided through the first and second converter switches 216, 218, energizing the inductor 224. In one example, the conduction path 406 may include at least one body diode of the switches 216a, 216b of the first converter switch 216. Likewise, in the fourth switch state, the first converter switch 216 remains turned on (i.e., closed) and the second converter switch 218 is turned off (i.e., opened) to decouple the backup power input 214 from the input selection circuit 220. As such, a conduction path 408 for the backup DC power is provided through the first diode 226, the inductor 224, and the first converter switch 216 to charge the second capacitor 234 and provide DC power to the second rail 206b of the DC bus 206.

Figure 5:
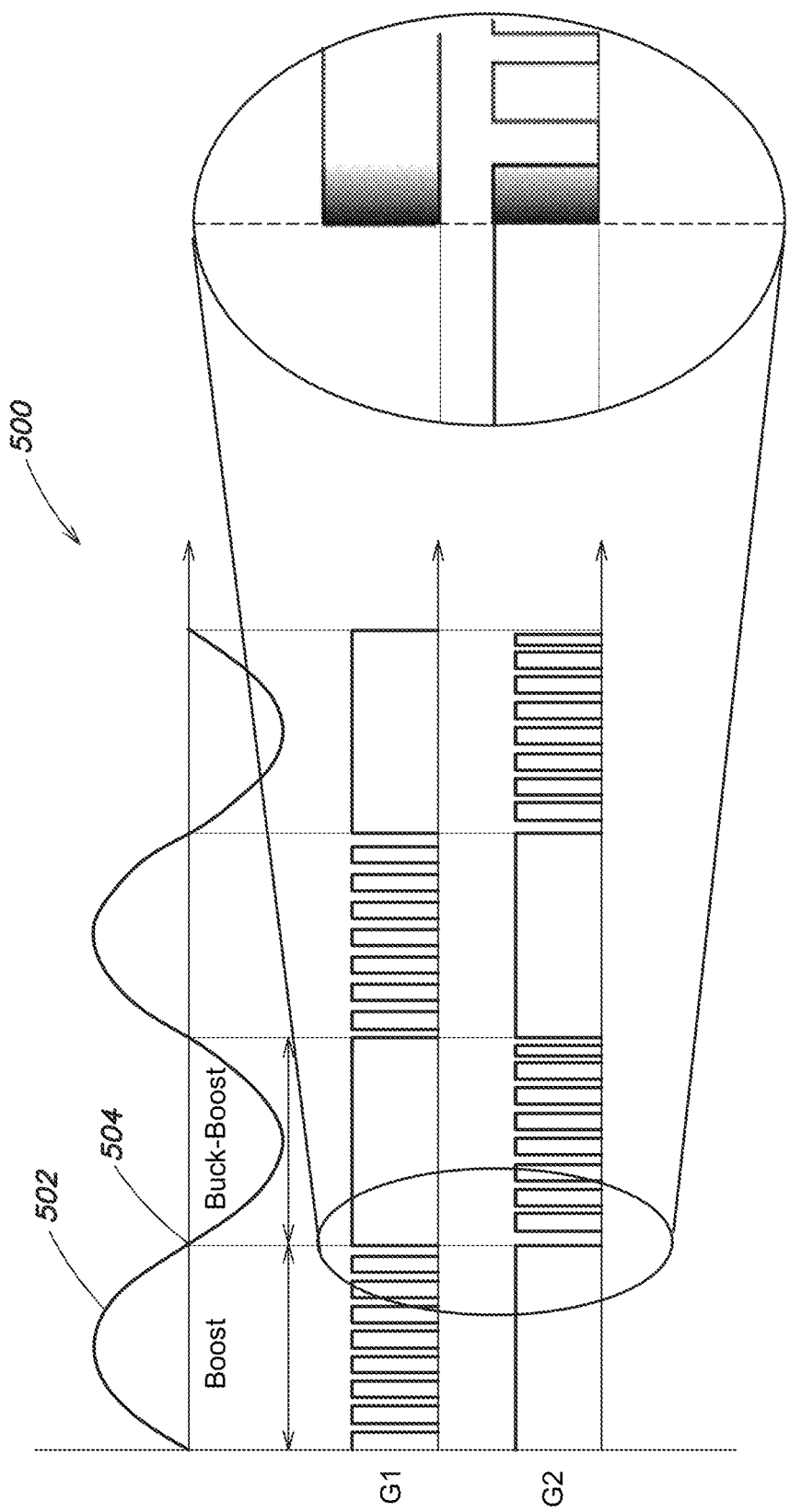
FIG. 5 is a graph illustrating control signals corresponding to the backup mode of operation in accordance to aspects described herein.

FIG. 5 is a graph 500 illustrating control signals corresponding to operation of the UPS topology 200 in the backup mode of operation. In one example, a first control signal "G1" represents a gate drive signal provided to the gate of the first converter switch 216 (i.e., the gates of the switches 216a, 216b). Likewise, a second control signal "G2" represents a gate drive signal provided to the gate of the second converter switch 218. In some examples, the gate drive signals "G1" and "G2" are Pulse-Width Modulation (PWM) signals. In one example, the waveform 502 corresponds to the output of the inverter 208 (i.e., the output AC voltage) during the backup mode of operation.

As described above, during the backup mode of operation and a positive half cycle of the output AC voltage 502, the UPS topology 200 is operated as a boost converter by transitioning the converter switches 216, 218 between the first and second switch states to provide DC power to the first rail 206a of the DC bus 206. As shown in the graph 500, the converter switches 216, 218 can be transitioned between the first and second switch states by modulating the first converter switch 216 via the gate drive signal "G1". Likewise, during the backup mode of operation and a negative half cycle of the output AC voltage 502, the UPS topology 200 is operated as a buck-boost converter by transitioning the converter switches 216, 218 between the third and fourth switch states to provide DC power to the second rail 206b of the DC bus 206. As shown in the graph 500, the converter switches 216, 218 can be transitioned between the third and fourth switch states by modulating the second converter switch 218 via the gate drive signal "G2".

While operating the UPS topology 200 in the backup mode of operation, the first and second converter switches 216, 218 may be transitioned between the various switch states using an overlapping modulation scheme. For example, at the zero-crossing point 504 of the output AC voltage 502, the UPS topology is transitioned from boost converter operation (i.e., first/second switch states) to buck-boost converter operation (i.e., third/fourth switch states). To prevent the inductor 224 from being disconnected during the transition (i.e., at both the first and second ends), the gate drive signals "G1" and "G2" are configured such that the first and second converter switches 216, 218 are both on (i.e., closed) for an overlapping period of time. In some examples, by preventing the inductor 224 from being disconnected during transitions, switching transients can be minimized and acceptable power quality can be maintained at the output 210 during the backup mode of operation. For example, maintaining a continuous inductor current may allow for high current spikes to be avoided, potentially preventing device and/or component failures.

As described above, a more cost effective and compact online UPS topology is provided herein. In at least one embodiment, the topology includes a converter selectively coupled to an input configured to receive input AC power and a backup power input configured to receive backup DC power. In one example, the converter is configured to provide DC power to a DC bus of the UPS derived from either the input AC power or the backup DC power. In some examples, being that the converter is a multi-function converter, the need for separate PFC and DC/DC converters can be eliminated. As such, the UPS topology may have a reduced component count, increasing the power density of the UPS and reducing cost.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit of and scope of this invention. Accordingly, the foregoing description and drawings are by way of example only.

What is claimed is:

1. An uninterruptible power supply (UPS) configured to operate in an AC power mode and a DC power mode, the UPS comprising:
   an AC input configured to receive AC power;
   a DC input configured to receive DC power;
   a converter including a common connection point, a first rail coupled to the common connection point, a second rail coupled to the common connection point, a first capacitor coupled between the first rail and ground, and a second capacitor coupled between ground and the second rail;
   a first switch coupled to the DC input and the second rail;
   a second switch coupled between the common connection point and ground; and
   a third switch coupled to the common connection point, the AC input, and the second rail.

2. The UPS of claim 1 wherein, in the AC power mode, the third switch is configured to couple the AC input to the common connection point and the second switch is configured to decouple the common connection point from ground, thereby providing a conducting path from the AC input to the first rail when the AC power has a positive voltage.

3. The UPS of claim 1 wherein, in the AC power mode, the third switch is configured to couple the AC input to the common connection point and the second switch is configured to couple the common connection point to ground, thereby providing a conducting path between the AC input and ground.

4. The UPS of claim 1 wherein, in the AC power mode, the third switch is configured to couple the AC input to the common connection point and the second switch is configured to decouple the common connection point and ground, thereby providing a conducting path from the second rail to the AC input when the AC power has a negative voltage.

5. The UPS of claim 1 wherein, in the DC power mode:
   the third switch is configured to couple the common connection point to the second rail, the second switch is configured to couple the DC input to the second rail, and the first switch is configured to decouple the common connection point from ground, thereby providing a conducting path from the DC input to the first rail; and
   the first capacitor is configured to operate as an open circuit.

6. The UPS of claim 1 wherein, in the DC power mode, the third switch is configured to couple the common connection point to the second rail, the second switch is configured to couple the DC input to the second rail, and the first switch is configured to couple the common connection point from ground, thereby providing a conducting path between the DC input and ground.

7. The UPS of claim 6 further comprising an inverter coupled to the converter and configured to convert power from the first rail or second rail into AC output power, wherein, in the DC power mode, when the AC output power has a positive voltage, DC power passes from the DC input to ground, and when the AC output power has a negative voltage, DC power passes from the second rail through the third switch to ground.

8. The UPS of claim 1 further comprising at least one controller and an AC output configured to provide AC output power, wherein the at least one controller is configured to control operation of the first switch, the second switch, andthe third switchbased on:
   in the AC power mode, a polarity of a voltage of the AC power, and
   in the DC power mode, a polarity of a voltage of the AC output power.

9. The UPS of claim 1 further comprising at least one controller, wherein:
   the at least one controller is configured to provide a relatively constant first gate drive signal to a gate of the first switch during a buck-boost mode of operation and provide an oscillating first gate drive signal to the gate of the first switch during a boost mode of operation; and
the at least one controller is configured to provide a relatively constant second gate drive signal to a gate of the second switch during the boost mode of operation and an oscillating first gate drive signal to the gate of the second switch during a buck-boost mode of operation.

10. The UPS of claim 1 further comprising a first diode coupled between the common connection point and the first rail, a second diode coupled between the common connection point and the second rail, and a third diode coupled between the third switch and the second rail.

11. A non-transitory computer-readable medium containing thereon computer-executable instructions for controlling an uninterruptible power supply (UPS) having an AC input configured to receive AC power, a DC input configured to receive DC power, a converter including a common connection point, a first rail coupled to the common connection point, a second rail coupled to the common connection point, a first capacitor coupled between the first rail and ground, a second capacitor coupled between ground and the second rail, a first switch coupled to the DC input and the second rail, a second switch coupled between the common connection point and ground, and a third switch coupled to the common connection point, the AC input, the second rail, the instructions instructing at least one processor to:
operate the UPS in an AC power mode responsive to the AC input receiving the AC power;
operate the UPS in a DC power mode responsive to the DC input receiving the DC power; and
based on whether the UPS is operating in the AC power mode or the DC power mode:
operate the first switch to selectively control a connection between the DC input and the second rail;
operate the second switch to selectively control a connection between the common connection point and ground; and
operate the third switch to selectively control a connection between the common connection point and the second rail and selectively control a connection between the common connection point and the AC input.

12. The non-transitory computer-readable medium of claim 11 wherein the instructions further instruct the at least one processor to:
provide, in the AC power mode, a gate drive signal to the first switch, the gate drive signal oscillating between a first voltage and a second voltage, the second voltage being lower that the first voltage, wherein the first voltage controls the first switch to couple ground to the common connection point, and the second voltage controls the first switch to decouple ground from the common connection point.

13. The non-transitory computer-readable medium of claim 11 wherein the instructions further instruct the at least one processor to:
provide, in the AC power mode, a gate drive signal to the third switch, wherein the gate drive signal controls the third switch to couple the AC input to the common connection point.

14. The non-transitory computer-readable medium of claim 11 wherein the instructions further instruct the at least one processor to:
provide, in the DC power mode, a first gate drive signal to the first switch and a second gate drive signal to the second switch, wherein the first gate drive signal oscillates between a first voltage and a second voltage and the second gate drive signal oscillates between a third voltage and a fourth voltage, wherein the first voltage controls the first switch to couple ground to the common connection point and the second voltage controls the first switch to decouple ground from the common connection point, and the third voltage controls the second switch to couple the DC input to the third switch and the fourth voltage controls the second switch to decouple the DC input from the third switch.

15. The non-transitory computer-readable medium of claim 14 wherein the instructions further instruct the at least one processor to:
hold the first gate drive signal at an approximately constant voltage while the second gate drive signal oscillates, and
hold the second gate drive signal at an approximately constant voltage while the first gate drive signal oscillates.

16. The non-transitory computer-readable medium of claim 11 wherein the instructions further instruct the at least one processor to:
provide, in the DC power mode, a gate drive signal to the third switch wherein the gate drive signal controls the third switch to couple the second rail to the common connection point.

17. A method of controlling an uninterruptible power supply (UPS) comprising:
in an AC power mode of operation:
coupling a common connection point and an AC input together via an input selection switch, the common connection point being further coupled to a first rail and a second rail;
coupling the AC input and the common connection point to ground via a first switch;
decoupling the AC input and the common connection point from ground via the first switch; and
decoupling a DC input from the second rail using a second switch;
in a DC mode of operation:
coupling the second rail to the common connection point via the input selection switch;
coupling the DC input to the second rail via the second switch;
decoupling the DC input from the second rail via the second switch;
coupling the common connection point to ground via the first switch; and
decoupling the common connection point from ground via the first switch; and
providing DC power to the first rail and the second rail.

18. The method of claim 17 further comprising, in the DC mode of operation during a positive half-cycle of output AC power, rapidly decoupling and coupling the common connection point to ground via the first switch while using the second switch to couple the DC input to the second rail.

19. The method of claim 17 further comprising, in the DC mode of operation during a negative half-cycle of output AC power, rapidly decoupling and coupling the DC input to the second rail via the second switch while using the first switch to couple the common connection point to ground.

20. The method of claim 17 further comprising converting the DC power provided to the first rail and the second rail to output AC power rated for use by a load.

* * * * *